United States Patent
Jayaraman et al.

(10) Patent No.: US 11,025,641 B2
(45) Date of Patent: Jun. 1, 2021

(54) SYSTEM FOR OPTIMIZING ACCESS CONTROL FOR SERVER PRIVILEGE

(71) Applicant: BANK OF AMERICA CORPORATION, Charlotte, NC (US)

(72) Inventors: Swaminathan T. Jayaraman, Burlington, MA (US); Aaron Gull, New York, NY (US); William P. Jacobson, Matthews, NC (US); Todd Michael Goodyear, New Hope, PA (US); Michael Rodger Rupert, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 183 days.

(21) Appl. No.: 16/107,746

(22) Filed: Aug. 21, 2018

(65) Prior Publication Data
US 2020/0067942 A1    Feb. 27, 2020

(51) Int. Cl.
*G06F 16/28*    (2019.01)
*H04L 29/06*    (2006.01)

(52) U.S. Cl.
CPC .......... *H04L 63/108* (2013.01); *G06F 16/285* (2019.01); *H04L 63/0876* (2013.01); *H04L 63/105* (2013.01)

(58) Field of Classification Search
CPC . H04L 63/108; H04L 63/0876; H04L 63/105; G06F 16/285
See application file for complete search history.

(56) References Cited

U.S. PATENT DOCUMENTS

| | | |
|---|---|---|
| 5,134,496 A | 7/1992 | Schwab et al. |
| 5,315,448 A | 5/1994 | Ryan |
| 5,421,013 A | 5/1995 | Smith |
| 6,009,170 A | 12/1999 | Sako et al. |
| 6,272,283 B1 | 8/2001 | Nguyen |
| 6,314,518 B1 | 11/2001 | Linnartz |
| 6,351,439 B1 | 2/2002 | Miwa et al. |
| 6,606,450 B1 | 8/2003 | Klebanoy et al. |
| 6,643,330 B1 | 11/2003 | Nakagawa et al. |

(Continued)

FOREIGN PATENT DOCUMENTS

| | | |
|---|---|---|
| WO | 199321586 A1 | 10/1993 |
| WO | 199511560 A1 | 4/1995 |

(Continued)

*Primary Examiner* — Lynn D Feild
*Assistant Examiner* — Vladimir I Gavrilenko
(74) *Attorney, Agent, or Firm* — Michael A. Springs; Moore & Van Allen PLLC; Anup Shrinivasan Iyer

(57) ABSTRACT

Systems, computer program products, and methods are described herein for optimizing access control for server privilege. The present invention is configured to electronically receive, from a first computing device associated with a user, a server access request to access one or more servers; determine a first time period associated with the server access request based on an amount of time required to execute a first action on the one or more servers, wherein the first time period is defined by a first time stamp and a second time stamp; initiate an access window at the first time stamp from which the first computing device is capable of executing the first action on the one or more servers; and automatically terminate the access window at the second time stamp.

20 Claims, 3 Drawing Sheets

(56) References Cited

U.S. PATENT DOCUMENTS

| | | |
|---|---|---|
| 6,664,976 B2 | 12/2003 | Lofgren et al. |
| 6,785,814 B1 | 8/2004 | Usami et al. |
| 6,985,410 B1 | 1/2006 | Furukawa et al. |
| 7,088,823 B2 | 8/2006 | Fetkovich |
| 7,098,931 B2 | 8/2006 | Patterson et al. |
| 2002/0030907 A1 | 3/2002 | Ikeda et al. |
| 2002/0131595 A1 | 9/2002 | Ueda et al. |
| 2003/0185125 A1 | 10/2003 | Sako |
| 2003/0215110 A1 | 11/2003 | Rhoads et al. |
| 2003/0235125 A1 | 12/2003 | Akita |
| 2004/0008866 A1 | 1/2004 | Rhoads et al. |
| 2004/0046774 A1 | 3/2004 | Rhoads et al. |
| 2004/0114907 A1 | 6/2004 | Rinaldi |
| 2004/0136536 A1 | 7/2004 | Michtchenko |
| 2005/0271364 A1 | 12/2005 | Collar |
| 2006/0026627 A1 | 2/2006 | Yang et al. |
| 2006/0168630 A1 | 7/2006 | Davies |
| 2007/0033360 A1 | 2/2007 | Kori et al. |
| 2007/0171921 A1* | 7/2007 | Wookey ................ G06F 9/5027 370/401 |
| 2008/0101679 A1 | 5/2008 | Rauh et al. |
| 2008/0260199 A1 | 10/2008 | Cowburn |
| 2008/0312952 A1 | 12/2008 | Gulfo et al. |
| 2009/0010550 A1 | 1/2009 | Chang et al. |
| 2015/0347734 A1* | 12/2015 | Beigi ..................... G06F 21/32 713/155 |
| 2017/0188232 A1* | 6/2017 | Raleigh ............... H04W 12/069 |
| 2018/0084012 A1* | 3/2018 | Joseph ............... H04L 63/1425 |

FOREIGN PATENT DOCUMENTS

| | | |
|---|---|---|
| WO | 199515635 A1 | 6/1995 |
| WO | 2005098832 A2 | 10/2005 |

\* cited by examiner

SYSTEM FOR OPTIMIZING ACCESS CONTROL FOR SERVER PRIVILEGE

FIELD OF THE INVENTION

The present invention embraces a system for optimizing access control for server privilege.

BACKGROUND

Controlling and monitoring privileged access is important to mitigate exposure posed by insider threats, preventing data breaches, and meeting compliance requirements within an existing active directory environment. To this extent, privileged access management adds protection to privileged groups that control access across a range of domain-joined computing devices and applications on those computing devices, thereby adding more monitoring, visibility, and fine-gained controls. However, entities are often required to walk a fine line between protecting the entities' critical data to ensure business continuity, and enabling users and administrators to be productive. Therefore, there is a need for a system for optimizing access control for server privilege to maximize business continuity and minimize unauthorized exposure.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system for optimizing access control for server privilege is presented. The system comprises at least one non-transitory storage device; and one or more processing devices coupled to the at least one non-transitory storage device, wherein the one or more processing devices are configured to: electronically receive, from a first computing device associated with a user, a server access request to access one or more servers; determine a first time period associated with the server access request based on an amount of time required to execute a first action on the one or more servers, wherein the first time period is defined by a first time stamp and a second time stamp; initiate an access window at the first time stamp from which the first computing device is capable of executing the first action on the one or more servers; and automatically terminate the access window at the second time stamp.

In some embodiments, the one or more processing devices are further configured to: retrieve from an access database, one or more past access requests; determine one or more computing devices associated with the one or more past access requests; determine one or more time periods associated with an execution of one or more actions using the one or more computing devices on the one or more servers; and calculate the first time period based on at least a weighted average of the one or more time periods associated with an execution of one or more actions using the one or more computing devices.

In some embodiments, the one or more processing devices are further configured to: retrieve information associated with one or more actions associated with the one or more past access requests executed on the one or more servers; determine one or more time periods associated with the execution of the one or more actions on the one or more servers; and calculate the first time period based on at least the one or more time periods associated with an execution of the one or more actions on the one or more servers.

In some embodiments, the one or more processing devices are further configured to: retrieve information associated with one or more authentication levels of one or more users associated with the one or more past access requests; determine one or more time periods associated with the execution of the one or more actions on the one or more servers by the one or more users; categorize the one or more time periods based on at least the one or more authentication levels; and calculate the first time period based on at least the one or more categorized time periods.

In some embodiments, the one or more processing devices are further configured to: determine a first authentication level associated with the user, wherein the first authentication level is associated with the one or more authentication levels; compare the first authentication level associated with the user with the one or more categorized time periods; and calculate the first time period based on at least determining a match between the first authentication level and at least one of the one or more categorized time periods.

In some embodiments, the one or more processing devices are further configured to: receive an indication that the user has initiated the execution of the first action on the one or more servers; determine that the execution of the first action exceeds the first time period, wherein the execution of the first action was initiated on or after the first time stamp; and terminate the access window immediately following the execution of the first action.

In some embodiments, the one or more processing devices are further configured to: terminate the access window at the second time stamp, thereby aborting the execution of the first action.

In some embodiments, the one or more processing devices are further configured to, in response to aborting the execution of the first action, generate a snapshot of the execution of the first action at the second time stamp, wherein the snapshot comprises information associated with the execution of the first action at the second time stamp; and store the snapshot in a remote database.

In some embodiments, the one or more processing devices are further configured to: electronically receive, from the first computing device associated with the user, a second server access request to access the one or more servers at a predetermined future time; retrieve, in response to receiving the second server access request, the snapshot from the remote database to be cached in a temporary storage location; initiate a presentation of a user interface for display on the first computing device, wherein the user interface comprises a prompt to receive a user input regarding a completion of the execution of the first action; electronically receive, via the user interface, the user input acknowledging the completion of the execution of the first action; retrieve the snapshot from the temporary memory location; and initiate the execution of the first action to completion.

A computer implemented method for optimizing access control for server privilege is presented. The method comprises electronically receiving, from a first computing device associated with a user, a server access request to access one or more servers; determining a first time period associated with the server access request based on an amount of time required to execute a first action on the one or more servers, wherein the first time period is defined by a first time stamp and a second time stamp; initiating an access window at the first time stamp from which the first computing device is capable of executing the first action on the one or more servers; and automatically terminating the access window at the second time stamp.

A computer program product for optimizing access control for server privilege is presented. The computer program product comprising a non-transitory computer-readable medium comprising code causing a first apparatus to: electronically receive, from a first computing device associated with a user, a server access request to access one or more servers; determine a first time period associated with the server access request based on an amount of time required to execute a first action on the one or more servers, wherein the first time period is defined by a first time stamp and a second time stamp; initiate an access window at the first time stamp from which the first computing device is capable of executing the first action on the one or more servers; and automatically terminate the access window at the second time stamp.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
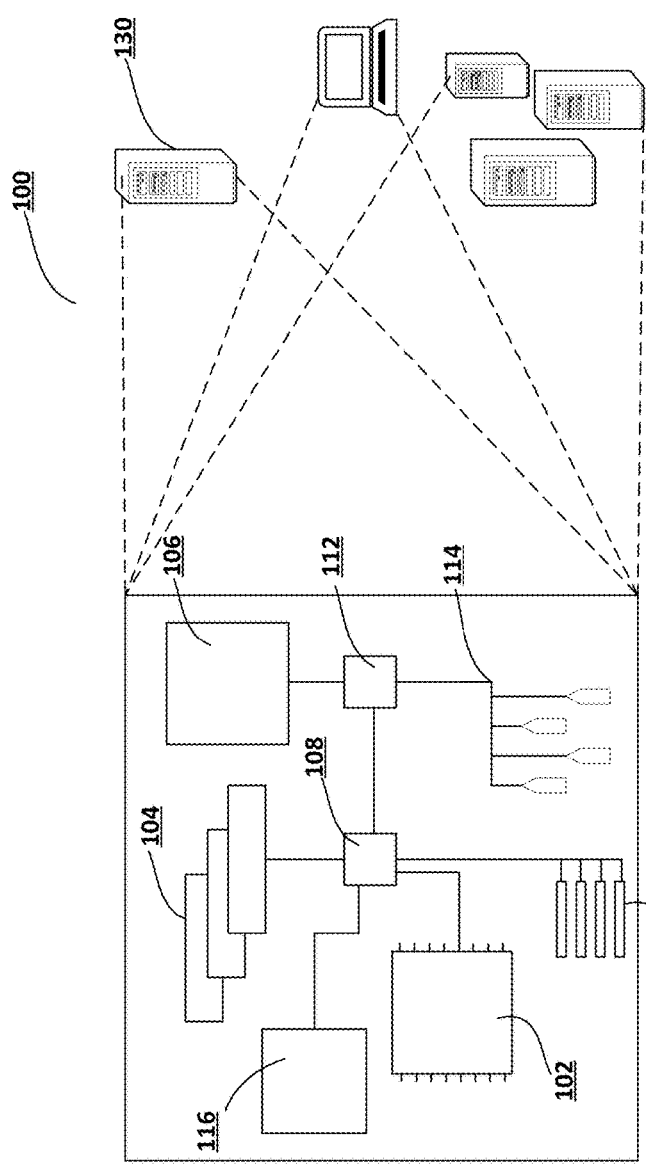
Figure 1:
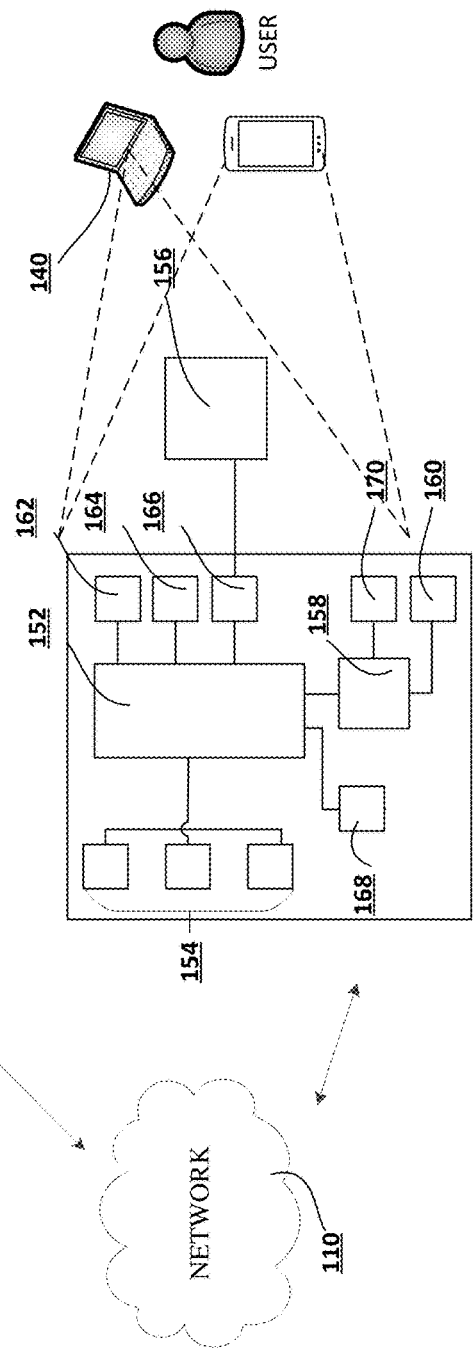
Figure 2:
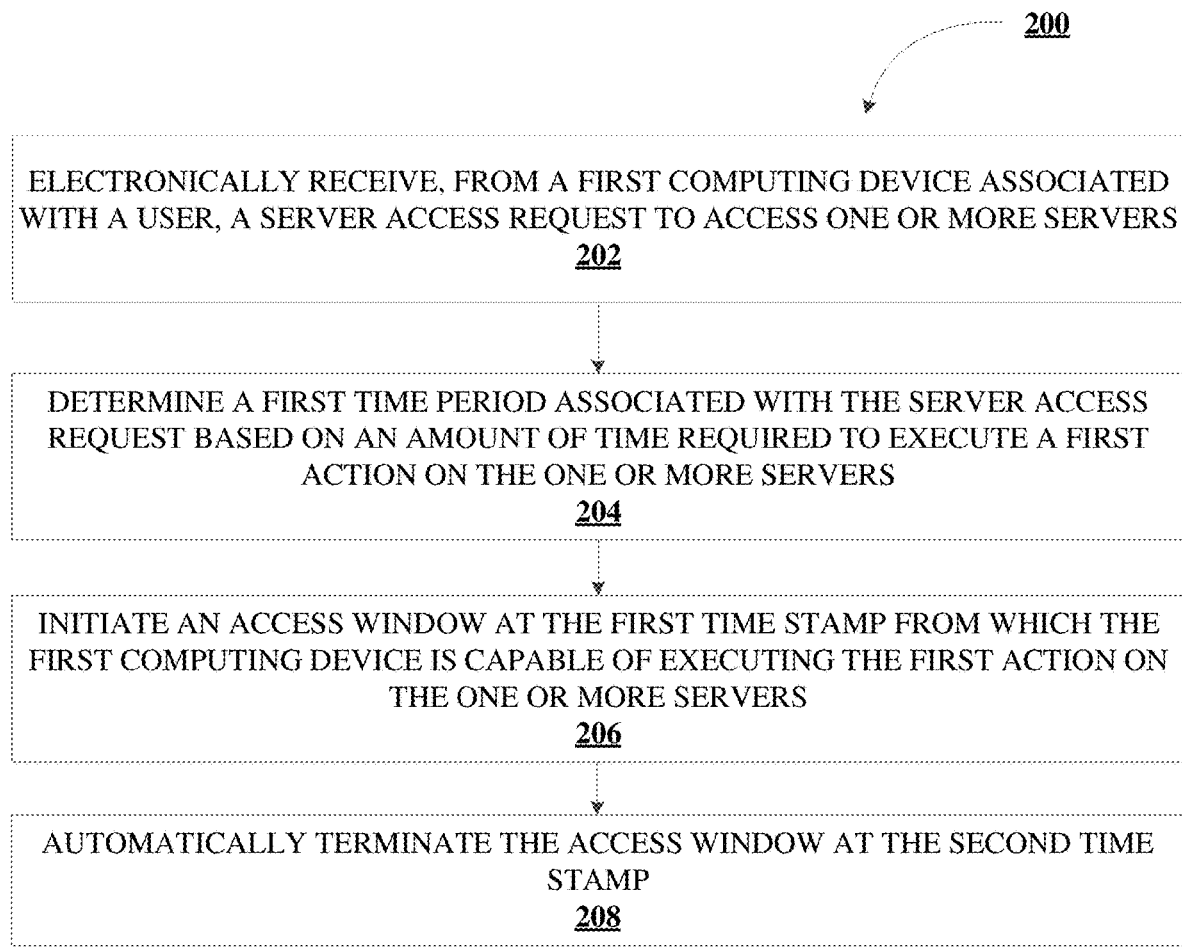
Figure 3:
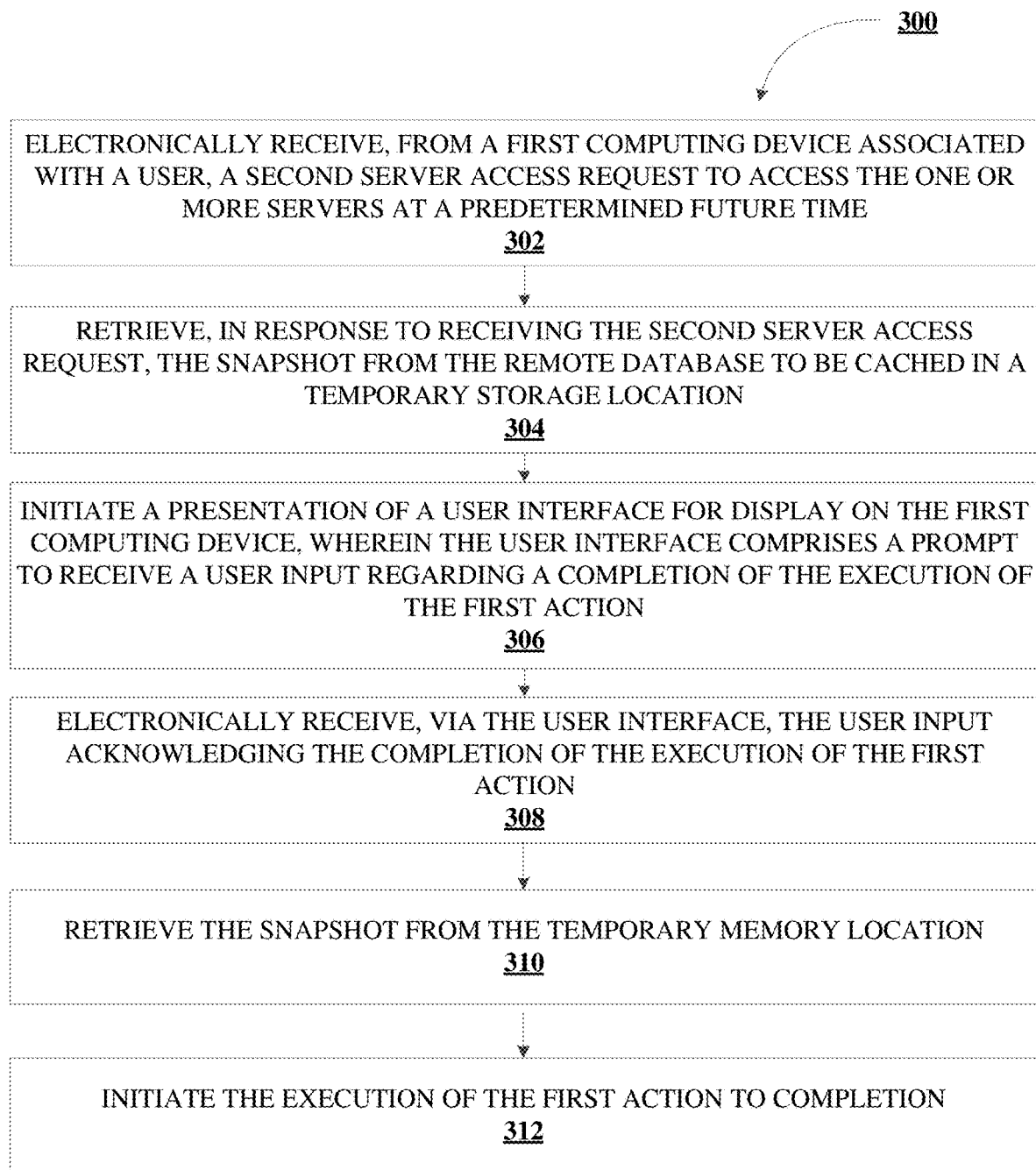

Having thus described embodiments of the invention in general terms, reference will now be made the accompanying drawings, wherein:

FIG. 1 illustrates technical components of a system for optimizing access control for server privilege, in accordance with an embodiment of the invention;

FIG. 2 illustrates a process flow for optimizing access control for server privilege, in accordance with an embodiment of the invention; and FIG. 3 illustrates a process flow for facilitating a completion of the execution of an action initiated during a server access request at predetermined future time, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 presents an exemplary block diagram of the system environment for optimizing access control for server privilege 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for optimizing access control for server privilege 200, in accordance with an embodiment of the invention. As shown in block 202, the process flow includes electronically receiving, from a first computing device associated with a user, a server access request to access one or more servers. In this regard, the system may be configured to initiate a control path connection on a network layer between one or more computing devices (e.g., the first computing device) attached to a dispersed network and at least one distributed server. In some embodiments, the system may be configured to require user authentication to establish the control path connection between the first computing device and the one or more servers.

User authentication may be required for a variety of purposes. For example, a user may be required to authenticate identity for access to an application stored on the servers, or for access to specific features, functions, or actions within an application(s) stored on the servers. The user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the system may be configured to enable user access to the server if the user has initiated the server access request via one or more pre-authorized applications stored on the first computing device. In one aspect, the user may initiate at least one of the one or more pre-authorized applications on the first computing device. In response, the pre-authorized application may require the user to provide authentication credentials to enable the user to access one or more features of the pre-authorized application, which may include the option to initiate a server access request. The user, once authenticated by the pre-authorized application, in some embodiments, may not require additional authentication to access the servers. In some other embodiments, the system may be configured to reduce a confidence level required to access the server if the user has transmitted the server access request via the pre-authorized application, instead of removing the authentication requirement entirely.

The different types of authentication may provide differing degrees of confidence regarding the authentication using such types. For example, if a username by itself is used for a user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

In some embodiments, the system may be configured to establish one or more limits to ensure that the actions being executed by the user are allowable. In this regard, the system may be configured to continuously monitor the actions being executed by the user using the computing device. In doing so, the system may be configured to determine that the user is executing the actions that are available to the user for execution based on the authentication credentials previously provided by the user. In this way, the system may be configured to ensure that the user does not violate and internal and/or external regulations while executing the actions.

Next, the process flow includes determining a first time period associated with the server access request based on an amount of time required to execute a first action on the one or more servers, as shown in block 204. The first time period is defined by a first time stamp and a second time stamp to indicate the time instant at which the first time period begins and the time instant at which the first time period terminates. In some embodiments, with each server access request, the user may execute one or more actions on the server. In one aspect, the one or more actions may be determined based on the level of authentication provided by the user. In some embodiments, an authentication with higher confidence will typically allow the user to execute more actions than an authentication with less confidence. In some other embodiments, an authentication with higher confidence may allow the user to execute one or more actions that involves information of sensitive nature, or data that is protected against unwarranted disclosure. Sensitive information includes all data, in its original and duplicate form, for which there is either a legal, ethical, or contractual requirement that it be protected or access-restricted. In some embodiments, the system may be configured to initiate a presentation of a user interface for display on the first computing device to list the one or more actions that may be executed by the user based on the authenticated server access request. The user may then choose to execute at least one action on the server, where each action is associated with an amount of time required to execute the action on the server.

The first time period may be calculated based on historical data available on past access requests. In some embodiments, the system may be configured to analyze the past access requests and determine the first time period based on the computing devices used to initiate the past access requests. In this regard, the system may be configured to determine the time periods associated with the execution of each action using one or more computing devices on the servers. In response, the system may be configured to calculate the first time period based on at least a weighted average of the time periods. In some embodiments, the weights for each access may be determined based on how each action was executed using a computing device. In one aspect, a computing device executing an action on the server may initiate the action to be executed on the server itself, and at its completion, retrieve the necessary results for further processing. In such situations, the first time period for access may be restricted to being sufficiently long to enable the user to initiate the action, since the computing device is not used for processing the action. In another aspect, a computing device executing an action on the server may initiate the action on the server, and process the action locally on the computing device itself. In such situations, the first time period may be based on the amount of time taken by the computing device to initiate and process the action thereon.

In one aspect, the amount of time taken by the computing device may also include a network access type associated with the past server access request. Common network access types include, but are not limited to Ethernet, wireless local area network (WLAN), asymmetric digital subscriber line (ADSL), cable modem, dialup, or the like. In determining the amount of time taken by the computing device to execute the action on the server in the past, the system may be configured to assign weights based on the network access type associated with each connection between the computing device and the server.

In some other embodiments, the system may be configured to determine the first time period based on analyzing an amount of time associated with the execution of the one or more actions in past access requests. In this regard, the system may be configured to determine a time period associated with the execution of each action. Each action may require a different amounts of time for successfully execution. In cases where the actions available to the user may be a portion of the features of the application, the amount of time may be determined based on the amount of time associated with the execution of the specific features of the application. Accordingly, the first time period may be determined based on a weighted average of each time period associated with the execution of the actions in past access requests.

In yet another embodiment, the system may be configured to determine the first time period based on analyzing the authentication levels of the users associated with past access requests. In this regard, the system may be configured to retrieve information associated with the one or more authentication levels of the one or more users associated with the past access requests. Next, the system may be configured to determine one or more time periods associated with the execution of the actions on the servers by these users. In some embodiments, users with a lower confidence level may require more time to execute an action than users with a higher confidence level. This may be because an action, when executed by a user with a lower confidence level may require a supervisory action to be successfully completed. The same action, when executed by a user with a higher confidence level (e.g., a user with supervisory capacity), the amount of time required to execute such an action may be relatively less. In response to determining the time periods, the system may then be configured to categorize the time periods based on the authentication levels. In doing so, the first time period may be determined based on a weighted average of the time period within each category. In this way, the system may be configured to determine the authentication level of the user, and determine the first time period by comparing the authentication level of the user with the categorized authentication levels.

In some embodiments, the system may be configured to use robotic process automation (RPA) to monitor the actions executed by the users to record the time it takes to execute the actions based on time elapsed between specific user interface actions (e.g., time between opening a particular screen and clicking a submit button). In this way, input/output inactivity could be factored out. In Robotic Process Automation (RPA), a computer system or robot may mimic the actions of a human being in order to perform a computer-based task. In other words, RPA can be used to interact with application software (or application, for short) through its user interface, as a human being would do. Therefore it is not necessary to integrate RPA with the existing applications at a programming level, thereby eliminating the difficulties inherent to integration, namely bringing together diverse components. In this way, RPA can be used to automate the execution of repetitive and manually intensive activities. RPA's potential benefits are manifold. They can include reducing costs (by cutting staff), lowering error rates, improving service, reducing turnaround time, increasing the scalability of operations, and improving compliance. In some embodiments, actions of the same type can be grouped to arrive at an appropriate time limit to maximize the number of successfully completed actions.

Next, the process flow includes initiating an access window at the first time stamp from which the first computing device is capable of executing the first action, as shown in block 206. In some embodiments, the access window is an amount of time the control path connection on the network layer between the computing device and the server is maintained, thus allowing the user to execute actions on the server. Next, as shown in block 208, the process flow includes automatically terminating the access window at a second time stamp associated with the first time period. In most cases, based on information associated with past access requests, the time during which access window remains open to facilitate data transfer between the computing device and the server is sufficient for the user to execute the action.

In some embodiments, the system may be configured to receive an indication that the user has initiated the execution of the first action on the one or more servers. In some cases, the system may be configured to determine that the execution of the first action exceeds the first time period. In one aspect, the system may be configured to terminate the access window immediately following the execution of the first action. In another aspect, the system may be configured to terminate the access window at the second time stamp, thereby aborting the execution of the first action. In some embodiments, the system may be configured to initiate a presentation of a countdown timer for display on the first computing device indicating to the user an amount of time available for the user to complete execution of the action. When the countdown timer reaches zero, the system may be configured to initiate a presentation of a user interface for display on the first computing device providing the user the option of requesting additional time. The user may then choose to request additional time to keep the access window open long enough to successfully execute the action. In such situations, the system may be configured to determine whether providing additional time to the user violates any of the previously established limits or any existing internal and/or external regulations. If providing additional time does not violate any limits or regulations, the system may then be configured to transmit control signals to the connection path on the network layer to keep the access window open for additional time. In one aspect, the additional time may be preset by the system. In another aspect, the additional time may be specified by the user.

FIG. 3 illustrates a process flow for facilitating a completion of the execution of an action initiated during a server access request at predetermined future time 300, in accordance with an embodiment of the invention. In cases where the user is unable to successfully complete the execution of the action on the server within the access window, the system may be configured to generate a snapshot of the execution of the first action at the second time stamp, and store the snapshot in a remote database. The snapshot includes information associated with the first action at the second time stamp. In some embodiments, the user may request permission to access the server to complete the action at a predetermined future time. In this regard, the system may receive, from the first computing device associated with the user, a second server access request to access the one or more servers at a predetermined future time, as shown in block 302. In response, the system may be configured to retrieve the snapshot from the remote database to be cached in a temporary memory location, as shown in block 304. Next, the system may be configured to initiate a presentation of a user interface for display on the first computing device with a prompt to receive a user input regarding a completion of the execution of the first action, as shown in block 306. Next, the system may be configured to receive, via the user interface, the user input acknowledging the completion of the execution of the first action, as shown in block 308. Once the user acknowledges the completion of the execution of the first action, the system may be configured to retrieve the snapshot from the temporary memory location, as shown in block 310. In response, initiate the execution of the first action to completion, as shown in block 312.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for optimizing access control for server privilege, the system comprising:
    at least one non-transitory storage device; and
    one or more processing devices coupled to the at least one non-transitory storage device, wherein the one or more processing devices are configured to:
        electronically receive, from a first computing device associated with a user, a server access request to access one or more servers;
        determine a first authentication level associated with the user, wherein the first authentication level is associated with one or more authentication levels;
        determine one or more time periods associated with an execution of one or more actions on the one or more servers by the one or more users;
        categorize the one or more time periods based on at least the one or more authentication levels;
        compare the first authentication level associated with the user with one or more categorized time periods;
        determine at least a portion of the one or more actions associated with the first authentication level, wherein at least the portion of the one or more actions are capable of being executed by the user with the first authentication level;
        electronically receive, from the first computing device, information associated with a first action to be executed on the one or more servers, wherein the first action is associated with at least the portion of the one or more actions;
        determine a computational requirement associated with the execution of the first action on the one or more servers based on at least the information associated with the first action;
        determine a first time period for the server access request indicating an amount of time required to execute the first action based on at least the computational requirement associated with the execution of the first action and at least one of the one or more categorized time periods, wherein the first time period is defined by a first time stamp and a second time stamp;
        initiate an access window at the first time stamp from which the first computing device is capable of executing the first action on the one or more servers; and
        automatically terminate the access window at the second time stamp.

2. The system of claim 1, wherein the one or more processing devices are further configured to:
    retrieve from an access database, one or more past access requests;
    determine one or more computing devices associated with the one or more past access requests;
    determine one or more time periods associated with an execution of one or more actions using the one or more computing devices on the one or more servers; and
    calculate the first time period based on at least a weighted average of the one or more time periods associated with an execution of one or more actions using the one or more computing devices.

3. The system of claim 2, wherein the one or more processing devices are further configured to:
    retrieve information associated with one or more actions associated with the one or more past access requests executed on the one or more servers; and
    calculate the first time period based on at least the one or more time periods associated with an execution of the one or more actions on the one or more servers.

4. The system of claim 2, wherein the one or more processing devices are further configured to:
    retrieve information associated with one or more authentication levels of one or more users associated with the one or more past access requests.

5. The system of claim 4, wherein the one or more processing devices are further configured to:
    determine a first authentication level associated with the user, wherein the first authentication level is associated with the one or more authentication levels;
    compare the first authentication level associated with the user with the one or more categorized time periods; and
    calculate the first time period based on at least determining a match between the first authentication level and at least one of the one or more categorized time periods.

6. The system of claim 1, wherein the one or more processing devices are further configured to:
    receive an indication that the user has initiated the execution of the first action on the one or more servers;
    determine that the execution of the first action exceeds the first time period, wherein the execution of the first action was initiated on or after the first time stamp; and
    terminate the access window immediately following the execution of the first action.

7. The system of claim 6, wherein the one or more processing devices are further configured to:
    terminate the access window at the second time stamp, thereby aborting the execution of the first action.

8. The system of claim 7, wherein the one or more processing devices are further configured to, in response to aborting the execution of the first action,
    generate a snapshot of the execution of the first action at the second time stamp, wherein the snapshot comprises information associated with the execution of the first action at the second time stamp; and
    store the snapshot in a remote database.

9. The system of claim 8, wherein the one or more processing devices are further configured to:
electronically receive, from the first computing device associated with the user, a second server access request to access the one or more servers at a predetermined future time;
retrieve, in response to receiving the second server access request, the snapshot from the remote database to be cached in a temporary storage location;
initiate a presentation of a user interface for display on the first computing device, wherein the user interface comprises a prompt to receive a user input regarding a completion of the execution of the first action;
electronically receive, via the user interface, the user input acknowledging the completion of the execution of the first action;
retrieve the snapshot from the temporary storage location; and
initiate the execution of the first action to completion.

10. A computer implemented method for optimizing access control for server privilege, the method comprising:
electronically receiving, from a first computing device associated with a user, a server access request to access one or more servers;
determining a first authentication level associated with the user, wherein the first authentication level is associated with one or more authentication levels;
determining one or more time periods associated with an execution of one or more actions on the one or more servers by the one or more users;
categorizing the one or more time periods based on at least the one or more authentication levels;
comparing the first authentication level associated with the user with one or more categorized time periods;
determining at least a portion of the one or more actions associated with the first authentication level, wherein at least the portion of the one or more actions are capable of being executed by the user with the first authentication level;
electronically receiving, from the first computing device, information associated with a first action to be executed on the one or more servers, wherein the first action is associated with at least the portion of the one or more actions;
determining a computational requirement associated with the execution of the first action on the one or more servers based on at least the information associated with the first action;
determining a first time period for the server access request indicating an amount of time required to execute the first action based on at least the computational requirement associated with the execution of the first action and at least one of the one or more categorized time periods, wherein the first time period is defined by a first time stamp and a second time stamp;
initiating an access window at the first time stamp from which the first computing device is capable of executing the first action on the one or more servers; and
automatically terminating the access window at the second time stamp.

11. The computer implemented method of claim 10, wherein the method further comprises:
retrieving from an access database, one or more past access requests;
determining one or more computing devices associated with the one or more past access requests;
determining one or more time periods associated with an execution of one or more actions using the one or more computing devices on the one or more servers; and
calculating the first time period based on at least a weighted average of the one or more time periods associated with an execution of one or more actions using the one or more computing devices.

12. The computer implemented method of claim 11, wherein the method further comprises:
retrieving information associated with one or more actions associated with the one or more past access requests executed on the one or more servers; and
calculating the first time period based on at least the one or more time periods associated with an execution of the one or more actions on the one or more servers.

13. The computer implemented method of claim 11, wherein the method further comprises:
retrieving information associated with one or more authentication levels of one or more users associated with the one or more past access requests.

14. The computer implemented method of claim 13, wherein the method further comprises:
determining a first authentication level associated with the user, wherein the first authentication level is associated with the one or more authentication levels;
comparing the first authentication level associated with the user with the one or more categorized time periods; and
calculating the first time period based on at least determining a match between the first authentication level and at least one of the one or more categorized time periods.

15. The computer implemented method of claim 11, wherein the method further comprises:
receiving an indication that the user has initiated the execution of the first action on the one or more servers;
determining that the execution of the first action exceeds the first time period, wherein the execution of the first action was initiated on or after the first time stamp; and
terminating the access window immediately following the execution of the first action.

16. The computer implemented method of claim 15, wherein the method further comprises:
terminating the access window at the second time stamp, thereby aborting the execution of the first action.

17. The computer implemented method of claim 16, wherein the method further comprises:
generating a snapshot of the execution of the first action at the second time stamp, wherein the snapshot comprises information associated with the execution of the first action at the second time stamp; and
storing the snapshot in a remote database.

18. The computer implemented method of claim 17, wherein the method further comprises:
electronically receiving, from the first computing device associated with the user, a second server access request to access the one or more servers at a predetermined future time;
retrieving, in response to receiving the second server access request, the snapshot from the remote database to be cached in a temporary storage location;
initiating a presentation of a user interface for display on the first computing device, wherein the user interface comprises a prompt to receive a user input regarding a completion of the execution of the first action;

electronically receiving, via the user interface, the user input acknowledging the completion of the execution of the first action;

retrieving the snapshot from the temporary storage location; and initiating the execution of the first action to completion.

19. A computer program product for optimizing access control for server privilege, the computer program product comprising a non-transitory computer-readable medium comprising code causing a first apparatus to:

electronically receive, from a first computing device associated with a user, a server access request to access one or more servers;

determine a first authentication level associated with the user, wherein the first authentication level is associated with one or more authentication levels;

determine one or more time periods associated with an execution of one or more actions on the one or more servers by the one or more users;

categorize the one or more time periods based on at least the one or more authentication levels;

compare the first authentication level associated with the user with one or more categorized time periods;

determine at least a portion of the one or more actions associated with the first authentication level, wherein at least the portion of the one or more actions are capable of being executed by the user with the first authentication level;

electronically receive, from the first computing device, information associated with a first action to be executed on the one or more servers, wherein the first action is associated with at least the portion of the one or more actions;

determine a computational requirement associated with the execution of the first action on the one or more servers based on at least the information associated with the first action;

determine a first time period for the server access request indicating an amount of time required to execute the first action based on at least the computational requirement associated with the execution of the first action and at least one of the one or more categorized time periods, wherein the first time period is defined by a first time stamp and a second time stamp;

initiate an access window at the first time stamp from which the first computing device is capable of executing the first action on the one or more servers; and automatically terminate the access window at the second time stamp.

20. The computer program product of claim 19, wherein the first apparatus is further configured to:

retrieve from an access database, one or more past access requests;

determine one or more computing devices associated with the one or more past access requests;

determine one or more time periods associated with an execution of one or more actions using the one or more computing devices on the one or more servers; and calculate the first time period based on at least a weighted average of the one or more time periods associated with an execution of one or more actions using the one or more computing devices.

* * * * *